United States Patent [19]

Gorges

[11] Patent Number: 4,557,961
[45] Date of Patent: Dec. 10, 1985

[54] LIGHT-WEIGHT, FIRE-RETARDANT STRUCTURAL PANEL

[75] Inventor: Friedrich J. Gorges, Bellevue, Wash.

[73] Assignee: The Boeing Company, Seattle, Wash.

[21] Appl. No.: 514,987

[22] PCT Filed: May 27, 1983

[86] PCT No.: PCT/US83/00837
§ 371 Date: May 27, 1983
§ 102(e) Date: May 27, 1983

[87] PCT Pub. No.: WO84/04727
PCT Pub. Date: Dec. 6, 1984

[51] Int. Cl.⁴ .............................................. B32B 3/12
[52] U.S. Cl. ...................................... 428/117; 52/806;
428/408; 428/421; 428/920
[58] Field of Search ...................... 52/806; 428/71, 73, 428/116–118, 920–921, 408, 421

[56] References Cited

U.S. PATENT DOCUMENTS

| | | | |
|---|---|---|---|
| 3,067,078 | 12/1962 | Gluck | 428/518 X |
| 3,407,110 | 10/1968 | Axelson et al. | 428/117 |
| 3,475,262 | 10/1969 | Sargent et al. | 428/117 |
| 3,502,171 | 3/1970 | Cowan | 428/116 X |
| 3,600,249 | 8/1971 | Jackson et al. | 428/116 X |
| 3,713,959 | 1/1973 | Rottmayer et al. | 428/116 X |
| 3,713,961 | 1/1973 | Copeland et al. | 428/473.5 X |
| 3,778,336 | 12/1973 | Adams | 428/116 |
| 3,811,997 | 5/1974 | Yuan | 428/116 |
| 3,930,085 | 12/1975 | Pasiuk | 428/116 |
| 3,993,827 | 11/1976 | Dukert et al. | 428/251 |
| 4,022,742 | 5/1977 | Yoshimura et al. | 427/314 |
| 4,061,812 | 12/1977 | Gilwee, Jr. et al. | 428/117 |
| 4,205,111 | 5/1980 | Pip et al. | 428/215 |
| 4,299,872 | 11/1981 | Miguel et al. | 428/117 |
| 4,330,494 | 5/1982 | Iwata et al. | 428/117 X |
| 4,344,995 | 8/1982 | Hammer | 428/116 X |

Primary Examiner—Henry F. Epstein
Attorney, Agent, or Firm—Hughes & Cassidy

[57] ABSTRACT

A composite, lightweight, fire-retardant laminar structural panel (10, 10', 10", 30) of the present invention comprising: (i) a sheet-like central honeycomb core (11) formed of aluminum, paper treated to improve its fire resistance characteristics, or the like; (ii) upper and lower imperforate face sheets (15, 16) formed of lightweight fibrous materials impregnated with a phenolic resin; (iii) a pair of upper and lower phenolic adhesive films (18, 19) interposed between the honeycomb core (11) and respective ones of the imperforate face sheets (15, 16) for adhesively bonding the face sheets (15, 16) to opposite sides of the core (11); and (iv), a fire-retardant coating (20) comprising a copolymer of vinylidene fluoride and hexafluoropropene applied to at least the exposed surface of the lower face sheet (16). In certain of the exemplary forms of the invention herein described, the composite, laminar panels (10, 10', 30) are designed to provide one of a plurality of different load bearing capacities dependent upon the type of use to which the panel is to be put; while in other exemplary forms of the invention, a given panel includes regions of differing density and/or of different numbers of face sheet plies; but, which is of uniform overall thickness so as to provide relatively high load bearing capacities in high traffic and/or high load environments and relatively low load bearing capacities in low traffic and/or low load environments.

33 Claims, 6 Drawing Figures

LIGHT-WEIGHT, FIRE-RETARDANT STRUCTURAL PANEL

BACKGROUND OF THE INVENTION

1. Technical Field

The present invention relates generally to composite structural panels fabricated of lightweight, fireproof materials; and, more particularly, to improved lightweight, fire-retardant structural panels of the type used as floor and/or bulkhead panels in, for example, aircraft, ships, submarines and the like wherein the materials employed must meet extremely stringent, and often conflicting, requisites in terms of strength, lightness in weight, ability to resist heat and/or fire, reduction of smoke and toxic fumes generated when subjected to fire, and improved sound deadening characteristics. For example, a field where the present invention finds particularly advantageous use is in the fabrication of floor and/or bulkhead panels for commercial aircraft—panels that are required to be as light as possible and as strong as possible while, at the same time, being capable of meeting and exceeding those standards which are established by regulatory agencies in terms of fire resistance and reduced emission of smoke and/or toxic fumes such, for example, as those fire standards developed, promulgated, and from time to time revised by the FAA and which are more commonly known as regulation "FAR 25"—standards which are constantly being upgraded and made even more rigorous in terms of those structures that will be approved for use in future commercial aircraft, particularly those to be made and introduced into commercial fleets in and/or shortly after 1984/1985.

2. Background Art

The present invention arose specifically in connection with the commercial aircraft industry and is intended to meet and exceed minimum fire resistance standards as established by the FAA—standards which are presently being revised and modified for proposed adoption during or shortly after 1984/1985. At the same time, however, the invention intimately involves other design considerations and constraints which are typically involved in the aircraft industry such, for example, as maximized strength at minimum weight for the particular materials employed, economy, durability, and ability to reduce and minimize noise levels in those regions of the aircraft where noise problems are normally encountered—for example, in the regions where airfoils, power propulsion plants and the like are attached to the aircraft fuselage, in the region of the wheel wells, etc. Thus, the materials employed and the specific constructional details disclosed for panels made in accordance with the present invention provide a synergistic result in terms of reduced weight and cost, reduced propensity to emit smoke and/or toxic fumes, increased strength and durability, increased fire resistance and/or fire retardance characteristics, increased heat and/or sound insulation, and increased versatility in terms of usage in specific environments where the strength required for any given panel may vary from region to region.

As is well known, today's commerical aircraft are subjected to very stringent requirements in terms of ability to withstand fire and to emit minimum quantities of smoke and/or other toxic fumes—standards established by the FAA under code regulation "FAR 25". However, this regulatory standard is continuously undergoing review and revision to improve the safety characteristics of the aircraft; and, at the present time, changes have been proposed for adoption in or shortly after 1984/1985 which will impart even greater and more stringent requirements with regard to design factors having a bearing on fire resistance and safety. The invention is particularly concerned with providing composite panels suitable for use as floor and/or bulkhead panels which will not only meet and exceed the proposed modified standards; but, in addition, which will enhance the strength and durability of the panels, decrease the weight thereof, increase the sound and/or heat insulating characteristics of the panels and, in general, achieve all of the design requirements on an economical basis.

In conventional aircraft available today, it is a common practice to form floor panels of composite sandwich-type construction, generally having a honeycomb core formed of paper treated with a fire resistant material and/or of fire resistant synthetic materials and sandwiched between upper and lower fiberglass face sheets bonded thereto by means of a conventional epoxy-type adhesive. Although the size of such panels is not critical and may be varied to meet desired conditions, the panels are commonly about 4'×4' in area and about ½" in thickness. However, such panels are commonly employed in different structural environments having different requirements in terms of, for example, load bearing capacity, strength, and/or sound deadening capacity. Thus, where the panels are employed as internal bulkheads, there is often very little load carrying capacity required; and, the degree of sound deadening characteristics required is a function of the location of the panel on the bulkhead—viz., whether the panel is to be employed adjacent a point of attachment of an airfoil, power plant or the like which serves to generate increased noise levels or, alternatively, whether it is to be employed at a region remote from any relatively troublesome sound sources. On the other hand, if the panel is to function as a floor panel, then its load bearing capacity becomes considerably more significant dependent upon whether the floor panel is for a cargo deck or for the passenger deck; and, in the latter instance, whether the panel is located in: (i) a low traffic area such as found beneath the seats in the passenger compartment; (ii) a high traffic area such as the galleys and/or passenger aisles; or (iii), in regions which bridge low and high traffic areas. Again, the particular location of the panel—i.e., whether it is in a region of high noise levels such as adjacent a wheel well or near an equipment area, or whether located in a region of relatively low noise levels—will be determinative of the sound deadening characteristics required.

Prior conventionally available composite panels have either been manufactured to meet the most severe conditions anticipated or have had to be specially fabricated to meet conditions peculiar to the environment within which the panel is to be used. Such panels have not employed a construction which permits any given panel to optimally meet differing design requirements and/or constraints in terms of load bearing capacity and/or sound deadening characteristics which will normally be encountered in the regions to be covered by such panels. Moreover, paper honeycomb cores sandwiched between fiberglass face sheets will not be capable of meeting the revised standards presently being proposed for adoption in FAA fire code regulation "FAR 25" as of 1984/1985.

Numerous approaches to the problems of providing lightweight, fire-retardant composite panels have heretofore been disclosed in the prior art. Typical of the disclosures are those found in, for example, U.S. Pat. Nos. 3,407,110—Axelson, et al.; 3,475,262—Sargent, et al.; 3,600,249—Jackson, et al; 4,061,812—Gilwee, Jr., et al.; 3,713,959—Rottmayer, et al.; 4,344,995—Hammer assigned to the assignee of the present invention; and, 3,778,336—Adams. Thus, both the Axelson, et al. and Sargent, et al. patents relate to heat shields suitable for use with space vehicles and which employ a honeycomb core made of phenolic-glass material (Axelson, et al) into which is added a foamed synthetic material— viz., an elastomeric asbestos fiber in Axelson, et al and various ablative silicone materials in Sargent, et al. Sargent, et al further suggest the use of a face sheet preferably formed of phenolic material. In Jackson, et al, the patentees disclose fiberglass fabrics impregnated with polyimide resins to impart flexibility during expansion of the honeycomb; while Gilwee, Jr., et al disclose honeycomb cores formed of polyamide and a combination of polyimide and glass, with a face sheet of fibrous material impregnated with polyimide resin. In Rottmayer, et al and Hammer, the honeycomb core is bonded to face sheets formed of graphite fibers imbedded in an epoxy matrix (Rottmayer, et al) and graphite reinforced laminates (Hammer). Adams discloses the use of a hexagonal honeycomb core formed of glass fibers impregnated with phenolic resins, and which is pyrolized and dusted with vinylidene fluoride. Other prior patents of miscellaneous interest include U.S. Pat. Nos. 3,811,997—Yuan (impregnated fibrous sheets and honeycomb type structures coated with polyimides); 3,930,085—Pasiuk (a honeycomb or foamed ceramic core with a glass-polyimide laminate); and, 4,299,872—Miguel, et al (intumescent and expanded intumescent materials in combination with a honeycomb core bound to a suitable metal or other laminate).

SUMMARY OF THE INVENTION

Composite, lightweight, fire-retardant laminar structural panel elements are disclosed which are particularly, but not exclusively, suitable for use as interior floor and/or bulkhead panels in aircraft—especially, commercial aircraft—ships, submarines and the like, and which are characterized by their ability to meet and exceed not only existing code regulations such as code regulation "FAR 25" established and promulgated by the FAA but, also, revised and modified requirements such as those proposed by the FAA for adoption in or shortly after 1984/1985. More specifically, the composite, lightweight, laminar structural panel of the present invention includes: (i) a sheet-like central honeycomb core formed of aluminum, paper treated to improve its fire resistance characteristics, or the like; (ii) upper and lower imperforate face sheets formed of lightweight fibrous materials impregnated with a phenolic resin; (iii) a pair of upper and lower phenolic adhesive films interposed between the honeycomb core and respective ones of the imperforate face sheets for adhesively bonding the face sheets to opposite sides of the core; and (iv), a fire-retardant coating comprising a copolymer of vinylidene fluoride and hexafluoropropene applied to at least the exposed surface of the lower face sheet. In certain of the exemplary forms of the invention herein described, the composite, laminar panels are designed to provide one of a plurality of different load bearing capacities dependent upon the type of use to which the panel is to be put; while in other exemplary forms of the invention, a given panel includes regions of differing density and/or of different numbers of face sheet plies; but, which is of uniform overall thickness so as to provide relatively high load bearing capacities in high traffic and/or high load environments and relatively low load bearing capacities in low traffic and/or low load environments. The honeycomb core of the panels may be uniformly and/or nonuniformly provided with a suitable foam filler formed of polymeric or polyimide materials and of either the closed or open cell foam variety to provide either generalized or localized regions of relatively high sound deadening and/or fire resistance characteristics, and wherein the foam filling tends to further strengthen and stabilize the honeycomb core structure without appreciably adding to the weight of the panel. Suitable anti-skid and/or water impervious surfaces may be applied to or formed on the upper face sheet for enabling usage in work areas such, for example, as floor panels in aircraft galleys.

More specifically, it is a general aim of the present invention to provide relatively strong, composite, lightweight, laminar panel elements suitable for use as floor and/or bulkhead panels characterized by their high resistance to fire and/or heat, lightness in weight, strength and/or durability, yet which can be readily modified in either localized regions of over the entire extent of each panel to provide one or more regions of optimized characteristics in terms of sound deadening, fire resistance and/or load bearing capacity.

A further important object of the invention is the provision of lightweight, composite panels having a preselected uniform density throughout to permit uniform load bearing characteristics, as well as permitting the fabrication of a given panel with a plurality of regions of differing load bearing characteristics suitable for use in adjacent areas respectively subjected to relatively high traffic/loads and relatively low traffic/loads.

Yet another object of the invention is the provision of composite, laminated, lightweight structural panels of the foregoing character which can be easily fabricated from commercially available materials at relatively low cost.

As the ensuing description proceeds, those skilled in the art will appreciate that while the invention finds particularly advantageous application in the aircraft industry, and it has been described in that particular environment, the invention is of broader application and can be used to form strong fire-resistant and/or accoustical insulator panels suitable for use in a wide variety of industries and construction projects.

DESCRIPTION OF THE DRAWINGS

These and other objects and advantages of the present invention will become more readily apparent upon reading the following detailed description and upon reference to the attached drawings, in which.

Figure 1:
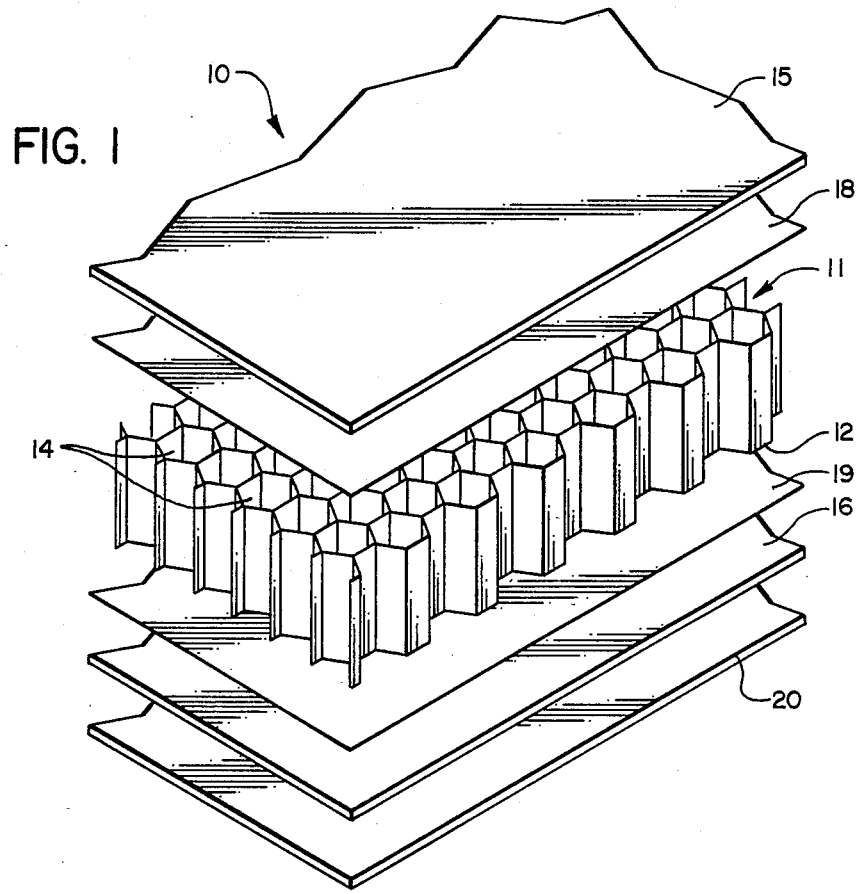
FIG. 1 is a fragmentary, exploded, perspective view of a portion of a composite, laminar, lightweight, fire-resistant structural panel embodying features of the present invention.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alteratives falling within the spirit and scope of the invention as expressed in the appended claims.

DETAILED DESCRIPTION

Figure 2:
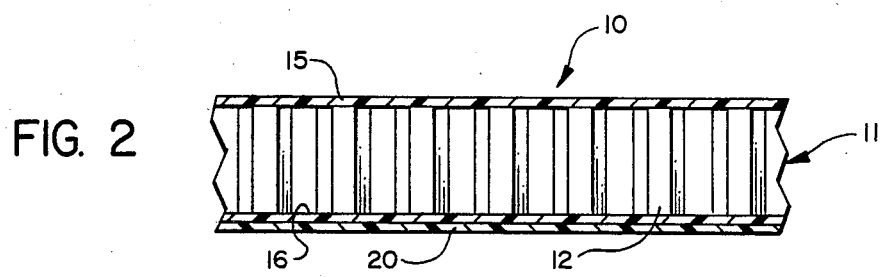
FIG. 2 is a fragmentary, vertical, sectional view through an assembled composite panel embodying the present invention.

Turning now to the drawings, there has been illustrated in FIGS. 1 and 2 a composite, laminar, lightweight, fire-retardant panel, generally indicated at 10 and shown in exploded form in FIG. 1, embodying features of the present invention. Thus, as here shown, the panel 10 is provided with a central honeycomb core, generally indicated at 11, defined by interlaced and/or interconnected upright spacer elements 12 and expanded into an hexagonal honeycomb structure defining a plurality of closely spaced nodules or cells 14. Upper and lower laminar face sheets 15, 16, respectively, are adhesively bonded to the honeycomb core 11 by means of upper and lower phenolic adhesive films 18, 19, respectively. Further, the composite, laminar panel 10 is provided with a fire-retardant coating 20 preferably formed of a copolymer of vinylidene fluoride and hexafluoropropene applied to at least the exposed surface of the lower face sheet 16, thus serving as an additional fire-retardant or resistant layer which is intended to be located on the side of panel 10 most closely proximate a potential fire hazard. For example, when the panel 10 comprises a floor panel intended for use on the floor or deck of an aircraft passenger compartment, the lower face sheet 16 will be most closely proximate to the cargo and/or equipment area of the aircraft; and, hence, it is this surface which is most desirably provided with an additional fire-retardant coating.

Those skilled in the art will, of course, appreciate that the particular size and/or shape of the panel 10 is not critical to the invention; and, such design considerations may vary widely dependent upon the nature of the panel and its intended use. However, when used as floor panels on commercial aircraft, the panels 10 are commonly formed in stock size(s) and/or shape(s)—e.g., the panel will commonly be about 4'×4' in area; about 0.6" in total thickness when used as a cargo floor panel; and, about 0.4" in total thickness when used as a passenger floor panel. While the exemplary panels are shown in rectilinear laminar shape, they can readily take other configurations and/or be cut and/or bent into desired shapes or configurations. In general, the particular shape and/or configuration will be selected by the panel designer dependent upon numerous other design considerations which are simply not related to the present invention and, therefore, which need not be described in detail herein. Moreover, the particular materials from which the overall composite laminar panel 10 are made may vary to some extent dependent upon the environment within which the panel is to be employed—all as hereinafter more fully described.

Thus, in carrying out the present invention, excellent results have been achieved when the honeycomb core 11 comprises a "Nomex" core—a commercially available paper core having hexagonal nodules or cells 14 and manufactured by Hexcell Products, Inc. of Havre de Grace, Md. However, other combustible materials may be employed such as end-grain balsa wood, foam and/or natural or synthetic materials provided only that such materials are first treated with a fire resistant substance as hereinafter described. Indeed, the spacer elements 12 defining the core 11 may be formed of lightweight materials characterized by their inherent lack of combustibility such, for example, as aluminum, in which event further fire retardant treatment of the spacer elements 12, per se, is not required. Where permitted and expedient, the use of aluminum honeycomb cores 11 can serve to reduce the overall cost of the panel core to about 40% of the cost of, for example, combustible paper Nomex cores. However, when using a Nomex paper core or a similar combustible core material, the core 11 is preferably dipped in a liquid bath of a phenolic resin and/or a copolymer of vinylidene fluoride and hexafluoropropene so as to render the otherwise combustible paper or paper-like spacers 12 fire retardant.

In keeping with the invention, the upper and lower face sheets 15, 16 are formed of a fibrous material impregnated with a phenolic resin so as to further enhance the fire resistance characteristics of the panel 10. While acceptable results have been attained using fiberglass materials impregnated with phenolic resin, even more satisfactory results have been attained utilizing graphite fibers impregnated with phenolic resin. Thus, not only have the phenolic resin impregnated graphite fibers demonstrated superior fire resistance characteristics than phenolic resin impregnated fiberglass laminations but, moreover, the impregnated graphite fibers have demonstrated equal strength characteristics at reductions in weight of about 10% as compared to impregnated fiberglass. In either case, however, the phenolic resin impregnated fibrous material exhibits significantly improved characteristics in terms of reduced emission of smoke and/or toxic fumes and increased thermal stability.

To bond the laminar face sheets 15, 16 to the honeycomb core 11 while further enhancing the fire resistance characteristics of the panel 10, it has been found desirable to employ phenolic adhesive films 18, 19 at the interfaces between the honeycomb core 11 and the upper and lower face sheets 15, 16, respectively. Thus, the resultant panel construction, such as that depicted in FIG. 2, comprises a composite, lightweight, laminar panel 10 having its fire resistance characteristics enhanced by: (i) the use of either a combustible honeycomb core material treated to render it noncombustible, or use of an inherently noncombustible lightweight spacer material such as aluminum; (ii) the use of phenolic resin impregnated fibrous face sheets preferably, but not essentially, formed of graphite fibers; (iii) the use of phenolic adhesive films 18, 19 to bond the core 11 and face sheets 15, 16 together into a unitary lightweight laminar panel; and (iv), the application of a fire-retardant coating 20 comprising a copolymer of vinylidene fluoride and hexafluoropropene on at least the exposed surface of the lower face sheet 16 which is intended to be mounted in facing relation to potential fire hazards.

Figure 3:
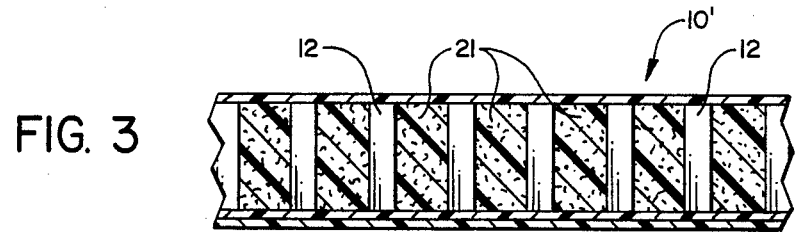
FIG. 3 is a fragmentary, vertical, sectional view similar to FIG. 2, but here illustrating the composite panel having its honeycomb core filled with an open cell phenolic or polyimide foam material.

In accordance with another important aspect of the invention, provision is made for enhancing the sound deadening characteristics, the fire resistance characteristics, and, to a limited extent, the strength and stability of panels made in accordance with the invention on either a localized regional basis within a given panel or, if required, throughout the entire extent of any given panel. To this end, and as best illustrated in FIG. 3, the honeycomb core 11 is provided with a foam filler 21 either throughout all of the nodules or cells 14 in any given panel or, if desired, throughout only a localized region of nodules or cells. The foam filler 21 is preferably formed of phenolic or polyimide material and may take the form of an open cell foam construction as shown in FIG. 3 or a closed cell construction—viz., microballoons or the like (not shown). The phenolic or polyimide material not only further enhances the fire resistance characteristics of the panel 10' but, in addition, the foam has proven to provide appreciable insulating properties both in terms of heat insulation and in terms of sound insulation. Thus, when located in regions of relatively high noise levels in aircraft, the use of foam fillers 21 in fire resistant panels 10' of the type herein described has been found capable of reducing the speech interference level in aircraft from about 68 db to about 62 db; and, such a reduction in the relatively high frequency noise level has proven highly desirable and beneficial. Moreover, tests have indicated that the stability of the core 11, and therefore its strength, is further increased by up to as much as a factor of 15%.

Figure 4:
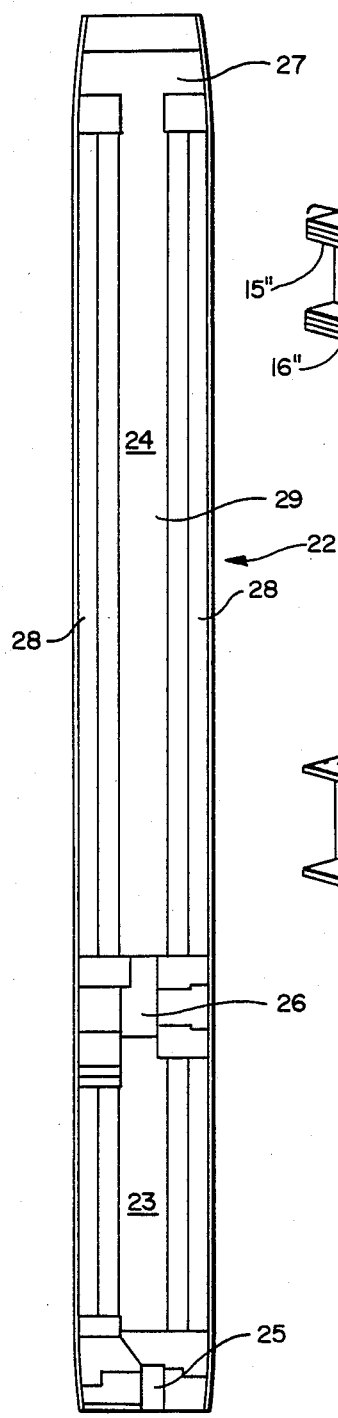
FIG. 4 is a highly diagrammatic floor plan of a conventional commercial aircraft, here illustrating particularly those areas where floor panels are subjected to relatively high loads and those areas where the floor panels are subjected to relatively low loads.

Having in mind the improved fire resistance and sound deadening characteristics achieved with lightweight laminar panel constructions embodying the features of the present invention, those skilled in the art are referred to FIG. 4 which, in highly diagrammatic fashion, is illustrative of a typical commercial aircraft passenger compartment floor plan. Thus, as here shown, the aircraft, generally indicated at 22, is provided with a first class cabin 23, a coach cabin 24, and fore, midsection and aft galleys, lavatory and/or work areas 25, 26 and 27. The port and starboard sides of the passenger cabin include port and starboard passenger seats diagrammatically illustrated at 28 with the cabin including a centrally located passenger aisle 29. Those skilled in the art will appreciate that those areas of the passenger cabin floor positioned beneath the passenger seats are relatively low traffic areas and are not required to have as great a load bearing capacity as are the more heavily trafficked galley, lavatories and/or work areas 25–27 and/or the aisle 29. Consequently, it has been found desirable to provide floor panels 10 in the under-seat areas which have a density of approximately 5 lbs./ft.$^3$ and a load bearing capacity of approximately 25 lbs./in.$^2$; whereas the more heavily trafficked aisle, galleys and work areas are desirably formed of panels having a density of approximately 8 lbs./ft.$^3$ and a load bearing capacity of approximately 40 lbs./in.$^2$. Unfortunately, however, it is not expedient nor economically feasible to design aircraft with passenger compartments having aisles 29 four feet (4') in width—viz., the normal size of a conventional floor panel. Consequently, prior to the advent of the present invention, the greater density floor panels having the higher load bearing capacity have been mounted in the aisles and have extended beyond the aisles beneath the port and starboard seats where such increased load bearing capacity is not required.

In accordance with another of the important objectives of the present invention, provision is made for forming composite, laminar, lightweight structural panels 10 which may be: (i) of entirely low density, low load bearing capacity construction; (ii) entirely high density, high load bearing capacity construction; or (iii), a combination of two or more regions of differing densities and/or load bearing capacity. For example, assuming that a passenger aisle is centered with respect to the aircraft fuselage and is approximately thirty inches in width, and assuming further that the centermost floor panel 10 has a width of forty-eight inches, the present invention permits the formation of floor panels having the centermost thirty inch region fabricated with a high density, high load bearing capacity construction, while the outermost nine inches along each longitudinal edge of the panel—viz., those portions of the panel projecting beneath the port and starboard seats—have a relatively low density, low load bearing capacity. To accomplish this, it is merely necessary to form the honeycomb core 11 (FIG. 1) of three discrete side-by-side sections in which the center section is formed of spacer elements 12 having a slightly greater thickness as constrasted with the spacer elements along the outermost nine inches of each longitudinal panel edge so as to increase the density of the central region of the panel. Obviously, however, if one or more panels are to be located only in the under-seat area, they need only have the low density, low load bearing capacity construction described above. Similarly, if a given panel is to be located only in a highly trafficked region such as a galley, it can be formed with only the higher density and higher load bearing capacity construction. And, of course, any given panel may be formed with any desired number of adjacent regions of varying load bearing capacity so as to meet the particular design requirements established.

Figure 5:
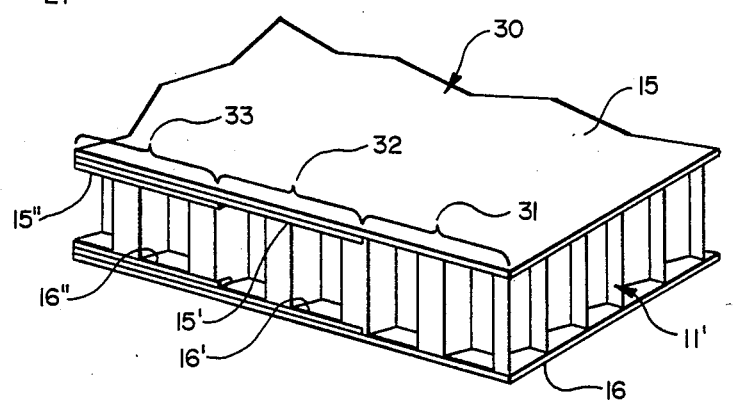
FIG. 5 is a perspective view illustrating a modified form of the invention wherein a given panel has a plurality of adjacent regions—here, three such regions—defining differing load bearing capacities; and, FIG. 6 is a perspective view of a slightly modified panel made in accordance with the present invention and here employing an anti-skid surface suitable for use in galleys and/or similar work areas.

Turning now to FIG. 5, a slightly modified form of the invention has been illustrated which is also capable fo producing lightweight, composite, laminar panels having regions of differing load bearing capacities. Thus, as here shown, the panel, generally indicated at 30, includes a first longitudinally extending edge region 31 which may be identical to the constructions previously described and illustrated in FIGS. 2 and 3; a second longitudinally extending central region 32 in which the honeycomb core 11' is stepped downwardly on both its upper and lower faces to define a core region of somewhat reduced height as contrasted with the core height in region 31; and, a third longitudinally extending edge region 33 in which the honeycomb core is again stepped downward on its upper and lower faces to define a core 11' having a still lesser height than the core in regions 31 and 32. The upper and lower face sheets 15, 16 are each provided with inner laminations 15', 16' which are coextensive with the reduced height core regions 32, 33 and with additional inner laminations 15", 16" which are coextensive with the reduced height core region 33. Thus, the panel 30 remains of uniform thickness and is provided with a central honeycomb core 11' defined by spacer elements of the same thickness throughout the entire panel 30. That is to say, the density of the core material remains essentially unchanged except for the decreased height of the spacers in regions 32, 33; but, the overall density and load bearing capacity of the panel is progressively increased from right to left as viewed in FIG. 5 by the inclusion of additional laminations 15', 16' in regions 32, 33 and 15", 16" in region 33. Although not illustrated in the drawings, those skilled in the art will appreciate that panel 30 could readily incorporate a longitudinally extending central region of maximum load bearing capacity—viz., a region having upper and lower face sheets 15, 16 with multiple inner plies—and longitudinally extending outer regions of lesser load bearing capacity defined by upper and lower face sheets 15, 16 of only one or two plies—thus again enabling such a panel to be used in areas such as the central passenger aisle where the central portion of the panel 30 provides the maximum load bearing capacity coextensive with the aisle width and the outer longitudinal edges of the panel having reduced load bearing capacities project into the under-seat areas.

Figure 6:
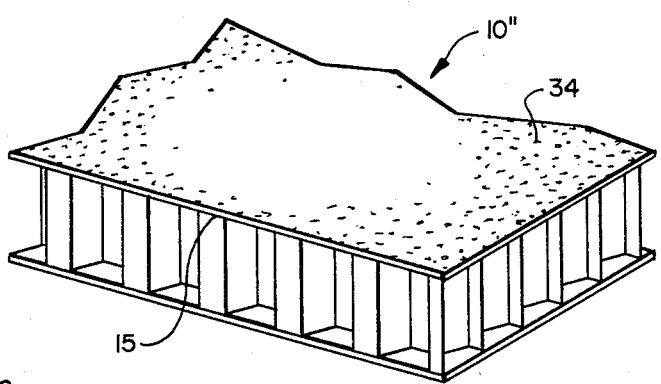

Referring next to FIG. 6, there has been illustrated a slightly modified composite, laminar, lightweight floor panel 10" which may be essentially the same as the panels 10 and 10' respectively shown in FIGS. 2 and 3 or the panel 30 shown in FIG. 5. However, in this instance it will be observed that the panel 10" is provided with a roughened anti-skid surface 34 which may be formed of, for example, a phenolic polyurethane type anti-skid material applied to the surface of the upper face sheet 15. Such a coating serves to not only prevent slipping but, moreover, as a waterproof barrier, thereby enabling the panel 10" to be employed in galleys or similar work areas without requiring the addition of carpeting thereover.

Thus, those skilled in the art will appreciate that there have herein been described various composite, lightweight, laminar structural panels that can be readily employed in various environments including, but not limited to, commercial passenger aircraft as either a floor panel or as a bulkhead panel. In either case, the panels are characterized by their fire resistance characteristics and, in those regions where noise is a problem, may include suitable foam fillers, preferably formed of phenolic or polyimide materials to further enhance fire resistance characteristics, which foam fillers serve to appreciably deaden the noise and reduce sound levels. The panels may be easily formed of a constant density and/or constant load bearing capacity throughout the entire panel area or, alternatively, the panels may be provided with localized regions of relatively high and/or relatively low load bearing capacities.

What is claimed is:

1. A composite, lightweight, fire-retardant structural panel element comprising, in combination:
   (a) a sheet-like lightweight fire-retardant honeycomb core;
   (b) means defining a pair of upper and lower imperforate face sheets formed of lightweight fire-retardant fibrous material impregnated with phenolic resin;
   (c) a pair of upper and lower phenolic adhesive films interposed between respective ones of said upper and lower face sheet defining means and said core for adhesively bonding said face sheet defining means to opposite sides of said core; and,
   (d) a fire-retardant coating applied to at least the exposed surface of said lower imperforate face sheet defining means, said coating comprising a copolymer of vinylidene fluoride and hexafluoropropene.

2. A composite, lightweight, fire-retardant structural panel element comprising, in combination:
   (a) a sheet-like lightweight fire-retardant honeycomb core;
   (b) means defining a pair of upper and lower imperforate face sheets formed of lightweight fire-retardant fibrous material impregnated with phenolic resin;
   (c) a pair of upper and lower phenolic adhesive films interposed between respective ones of said upper and lower face sheet defining means and said core for adhesively bonding said face sheet defining means to opposite sides of said core;
   (d) at least one of said core and said face sheet defining means including means defining at least two regions of differing load bearing capacity whereby a single one of said composite panel elements permits of use as a floor panel covering both a first region subjected to relatively high load bearing conditions and a second region subjected to relatively low load bearing conditions; and,
   (e) a fire-retardant coating applied to at least the exposed surface of said lower imperforate face sheet defining means, said coating comprising a copolymer of vinylidene fluoride and hexafluoropropene.

3. A composite, lightweight, fire-retardant structural panel element as set forth in claims 1 or 2 wherein said honeycomb core comprises cell defining means formed of paper coated with at least one of a phenolic resin and/or a copolymer of vinylidene fluoride and hexafluoropropene.

4. A composite, lightweight, fire-retardant structural panel element as set forth in claim 3 wherein at least a portion of said cell defining means are filled with a fire retardant, noise-deadening synthetic foam material.

5. A composite, lightweight, fire-retardant structural panel element as set forth in claim 4 wherein said synthetic foam material is an open cell foam.

6. A composite, lightweight, fire-retardant structural panel element as set forth in claim 4 wherein said synthetic foam material is a closed cell foam.

7. A composite, lightweight, fire-retardant structural panel element as set forth in claim 4 wherein said synthetic foam material comprises a phenolic material.

8. A composite, lightweight, fire-retardant structural panel element as set forth in claim 4 wherein said synthetic foam material comprises a polyimide.

9. A composite, lightweight, fire-retardant structural panel element as set forth in claims 1 or 2 wherein said honeycomb core comprises cell defining means formed of aluminum.

10. A composite, lightweight, fire-retardant structural panel element as set forth in claim 9 wherein at least a portion of said cell defining means are filled with a fire retardant, noise-deadening synthetic foam material.

11. A composite, lightweight, fire-retardant structural panel element as set forth in claim 10 wherein said synthetic foam material is an open cell foam.

12. A composite, lightweight, fire-retardant structural panel element as set forth in claim 10 wherein said synthetic foam material is a closed cell foam.

13. A composite, lightweight, fire-retardant structural panel element as set forth in claim 10 wherein said synthetic foam material comprises a phenolic material.

14. A composite, lightweight, fire-retardant structural panel element as set forth in claim 10 wherein said synthetic foam material comprises a polyimide.

15. A composite, lightweight, fire-retardant structural panel element as set forth in claims 1 or 2 wherein said imperforate face sheets are formed of graphite fibers.

16. A composite, lightweight, fire-retardant structural panel element as set forth in claim 15 wherein said honeycomb core comprises cell defining means formed of paper coated with at least one of a phenolic resin and/or a copolymer of vinylidene fluoride and hexafluoropropene.

17. A composite, lightweight, fire-retardant structural panel element as set forth in claim 16 wherein at least a portion of said cell defining means are filled with a fire retardant, noise-deadening synthetic foam material.

18. A composite, lightweight, fire-retardant structural panel element as set forth in claim 15 wherein said honeycomb core comprises cell defining means formed of aluminum.

19. A composite, lightweight, fire-retardant structural panel element as set forth in claim 18 wherein at least a portion of said cell defining means are filled with a fire retardant, noise-deadening synthetic foam material.

20. A composite, lightweight, fire-retardant structural panel element as set forth in claims 1 or 2 wherein said imperforate face sheets are formed of fiberglass.

21. A composite, lightweight, fire-retardant structural panel element as set forth in claim 20 wherein said honeycomb core comprises cell defining means formed of paper coated with at least one of a phenolic resin and/or a copolymer of vinylidene fluoride and hexafluoropropene.

22. A composite, lightweight, fire-retardant structural panel element as set forth in claim 21 wherein at least a portion of said cell defining means are filled with a fire retardant, noise-deadening synthetic foam material.

23. A composite, lightweight, fire-retardant structural panel element as set forth in claim 20 wherein said honeycomb core comprises cell defining means formed of aluminum.

24. A composite, lightweight, fire-retardant structural panel element as set forth in claim 23 wherein at least a portion of said cell defining means are filled with a fire retardant, noise-deadening synthetic foam material.

25. A composite, lightweight, fire-retardant structural panel element as set forth in claims 1 or 2 wherein the exposed upper surface of said upper imperforate face sheet defining means comprises an anti-skid surface.

26. A composite, lightweight, fire-retardant structural panel element as set forth in claims 1 or 2 wherein said upper imperforate face sheet defining means comprises a waterproof barrier.

27. A composite, lightweight, fire-retardant structural panel element as set forth in claim 25 wherein said upper imperforate face sheet defining means comprises a waterproof barrier.

28. A composite, lightweight, fire-retardant structural panel element as set forth in claim 25 wherein said anti-skid surface is formed of a phenolic polyurethane.

29. A composite, lightweight, fire-retardant structural panel element as set forth in claim 1 wherein said panel element has a density on the order of 8 lbs./ft.$^3$ and a load bearing capacity on the order of 40 lbs./in.$^2$.

30. A composite, lightweight, fire-retardant structural panel element as set forth in claim 1 wherein said panel element has a density on the order of 5 lbs./ft.$^3$ and a load bearing capacity on the order of 25 lbs./in.$^2$.

31. A composite, lightweight, fire-retardant structural panel element as set forth in claim 2 wherein said at least two regions of differing load bearing capacity are defined by corresponding regions in said core having differing densities.

32. A composite, lightweight, fire-retardant structural panel element as set forth in claim 2 wherein said at least two regions of differing load bearing capacity are defined by corresponding regions in said core having differences thicknesses and wherein at least one of said upper and lower imperforate face sheet defining means includes multiple plies of impregnated fibrous material in the regions of reduced thickness core so as to form a panel element of constant thickness and having upper and lower imperforate face sheet defining means including outer plies coextensive in area with the area of said panel element.

33. A composite, lightweight, fire-retardant structural panel element as set forth in claims 31 or 32 wherein said panel element has a density on the order of 8 lbs./ft.$^3$ and a load bearing capacity on the order of 40 lbs./in.$^2$ in a first region and a density on the order of 5 lbs./ft.$^3$ and a load bearing capacity on the order of 25 lbs./in.$^2$ in a second region.

* * * * *